(12) United States Patent
Bernard et al.

(10) Patent No.: US 8,158,817 B2
(45) Date of Patent: Apr. 17, 2012

(54) SYNTHESIS OF ACYLUREAS AND COMPOSITION COMPRISING ACYLUREAS

(75) Inventors: Jean-Marie Bernard, Saint-Laurent D'Agny (FR); Denis Revelant, Genas (FR); Cédric Amouyal, Grigny (FR)

(73) Assignee: Perstorp France, Saint-Priest (FR)

( * ) Notice: Subject to any disclaimer, the term of this patent is extended or adjusted under 35 U.S.C. 154(b) by 45 days.

(21) Appl. No.: 12/714,873

(22) Filed: Mar. 1, 2010

(65) Prior Publication Data

US 2010/0216966 A1 Aug. 26, 2010

Related U.S. Application Data

(62) Division of application No. 10/582,438, filed as application No. PCT/FR2004/003262 on Dec. 16, 2004, now abandoned.

(30) Foreign Application Priority Data

Dec. 24, 2003 (FR) .................................... 03 15409

(51) Int. Cl.
| | | |
|---|---|---|
| C07C 273/00 | (2006.01) | |
| C07C 273/18 | (2006.01) | |
| C07C 275/46 | (2006.01) | |
| C07C 275/48 | (2006.01) | |
| C07C 275/62 | (2006.01) | |

(52) U.S. Cl. .................... 560/336; 252/182.2; 560/330; 560/335; 564/38; 564/44; 564/45

(58) Field of Classification Search ............... 252/182.2; 560/330, 335, 336; 564/38, 44, 45
See application file for complete search history.

(56) References Cited

U.S. PATENT DOCUMENTS

| 3,383,400 | A | 5/1968 | Mennicken et al. |
|---|---|---|---|
| 3,517,039 | A | 6/1970 | Wagner et al. |
| 4,077,989 | A | 3/1978 | Schafer et al. |
| 4,124,569 | A | 11/1978 | Bock et al. |
| 4,517,353 | A | 5/1985 | Zecher et al. |
| 4,625,052 | A | 11/1986 | Konig et al. |
| 6,384,175 | B1 * | 5/2002 | Danielmeier et al. .......... 528/73 |
| 2002/0123596 | A1 | 9/2002 | Gurtler et al. |
| 2007/0106048 | A1 | 5/2007 | Bernard et al. |

FOREIGN PATENT DOCUMENTS

| DE | 1 230 778 B | 12/1966 |
|---|---|---|
| EP | 1 238 993 A1 | 9/2002 |
| GB | 1 515 523 A | 6/1978 |
| WO | WO 2005/070882 A3 | 4/2005 |

OTHER PUBLICATIONS

International Search Report for PCT/FR2004/003262 dated Dec. 22, 2005.

* cited by examiner

*Primary Examiner* — Rabon Sergent
(74) *Attorney, Agent, or Firm* — Buchanan Ingersoll & Rooney PC

(57) ABSTRACT

The invention relates to a process for the synthesis of a polyisocyanate composition comprising acylureas. According to the invention, a starting composition comprising a compound having at least two isocyanate functional groups is subjected to a reaction with at least two acid functional groups, with at least one of the acid functional groups having a pKa value of less than or equal to 3, and at least one of the acid functional groups having a pKa value of more than 3 and less than or equal to 6, at a temperature at least equal to 50 ° C., wherein the acid functional group having a pKa value of less than or equal to 3 and the acid functional group having a pKa value of more than 3 and less than or equal to 6 are present on two different acids or on the same acid.

24 Claims, No Drawings

SYNTHESIS OF ACYLUREAS AND COMPOSITION COMPRISING ACYLUREAS

CROSS REFERENCE TO PRIOR APPLICATION

This application is a continuation of U.S. application Ser. No. 10/582,438 (now abandoned) filed Jun. 9, 2006, incorporated by reference herein in its entirety and relied upon, which claims benefit in the U.S. national stage of PCT/FR2004/003262 filed Dec. 16, 2004.

CROSS-REFERENCE TO FOREIGN PRIORITY APPLICATIONS

This application claims the priority of Application No. 03/15409 filed in France on Dec. 24, 2003.

A subject matter of the present invention is compositions comprising acylureas and a process for producing such compositions: an improved process resulting in biuret-based oligomers is also targeted.

In order to place the present invention in industrial and semantic context, it is advisable to restate a certain number of points and to specify or recall a certain number of definitions.

Predominantly, polyisocyanate compositions are generally formed from derivatives resulting from the oligocondensation of individual di-, tri- or indeed even tetraisocyanate molecule(s).

Such a type of molecule is described as "monomers" and is capable of being obtained by phosgenation of a di(primary amine), optionally carrying one, indeed even two, other primary amine functional groups. Thus, such a molecule comprises a unit composed of a carbon chain carrying at least two nitrogens (originating from the diamine to be phosgenated), which unit will be denoted by "diamino unit" in the continuation of the description. The diamino unit serves here as vestiges or mark of the existence, past or present, of an isocyanate monomer: thus, the diamino unit has the structure

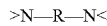

where R represents a hydrocarbon radical which is the residue of an isocyanate monomer, after ignoring two isocyanate functional groups. Of course, R does not exhibit any of the functional groups created during the oligomerization of an isocyanate functional group, namely the carbamate, urea (including biuret), allophanate or biuret functional groups and those which are mentioned on the occasion of the description of the oligocondensation (including oligomerization). The molecular weight of —R— is at most equal to 200. R can comprise another "amino" group in the case of the trifunctional monomers, such as LTI, NTI and UTI. The "amino" symbols N< and >N mean that the nitrogen can be inserted into any functional group, such as isocyanate, amine, amide, imide or urea functional group, and in particular the functional groups generated by the oligomerization reactions. These diamino units are found in virtually all of the oligocondensations and in the vast majority of the conversions of the isocyanate functional groups. This observation makes it possible to refer to the number of diamino units in order to indicate in particular the state of condensation of the oligocondensates (including oligomers), indeed even of the polycondensates, and even in the case of heterocondensates (in which cases it is possible to have several types of diamino units).

According to the usage common in chemistry, when a functional group has given its name to a family of compounds, as is the case for the isocyanates, the aromatic or aliphatic nature is defined according to the point of attachment of the functional group under consideration. When an isocyanate is situated on a carbon of aliphatic nature, then the isocyanate compound is itself considered to be of aliphatic nature. Likewise, when an isocyanate functional group is attached to the backbone via a carbon of aromatic nature, then the whole monomer will be denoted by the expression "aromatic isocyanate".

To clarify this point, it may be restated that:
any isocyanate functional group having a point of attachment which is a member of an aromatic ring is regarded as aromatic;
any isocyanate functional group having a point of attachment (of the nitrogen, of course) which is a carbon of $sp^3$ hybridization is regarded as aliphatic.

The following distinctions may be made among aliphatic isocyanates:

Any aliphatic isocyanate functional group having a point of attachment separated from the closest ring by at most one carbon (it is even preferably directly connected to it) is regarded as cycloaliphatic.

Any isocyanate functional group having a point of attachment carried by a secondary $sp^3$ carbon (that is to say, a carbon connected to two carbons and to a hydrogen) is regarded as secondary.

Any isocyanate functional group having a point of attachment carried by a tertiary $sp^3$ carbon (that is to say, a carbon connected to three carbons) is regarded as tertiary.

Any isocyanate functional group having a point of attachment carried by an $sp^3$ carbon itself carried by a tertiary carbon (that is to say, not taking into account the final bond, a carbon connected to three carbons) is regarded as neopentylic.

Any isocyanate functional group having a point of attachment carried by a methylene sensu stricto (—$CH_2$—) itself carried by an exocyclic and nontertiary $sp^3$ carbon is regarded as linear.

As regards the monomers, for the continuation of the description:

"aliphatic" is understood to mean any monomer, all the isocyanate functional groups of which are aliphatic;

"aromatic" is understood to mean any monomer, all the isocyanate functional groups of which are aromatic;

"mixed" is understood to mean any monomer, one functional group at least of which is aliphatic and one functional group at least of which is aromatic;

"cycloaliphatic" is understood to mean any monomer, all the isocyanate functional groups of which are aliphatic and one at least of which is cycloaliphatic;

"linear aliphatic" is understood to mean any monomer, all the isocyanate functional groups of which are aliphatic, none of which is cycloaliphatic and one at least of which is linear, or which exhibit at least one polymethylene sequence, free in rotation and thus exocyclic, $(CH_2)_\pi$ where $\pi$ represents an integer at least equal to two.

To explain in a little more detail, the isocyanate monomers can be:

aliphatic, including cycloaliphatic and arylaliphatic (or araliphatic), such as:
as linear (or simple) aliphatic, polymethylene diisocyanate monomers which exhibit one or more exocyclic polymethylene sequences $(CH_2)_\pi$ where $\pi$ represents an integer from 2 to 10, advantageously from 4 to 8, and in particular hexamethylene diisocyanate, it being possible for one of the methylenes to be substituted by a methyl or ethyl radical, as is the case with MPDI (methylpentamethylene diisocyanate);

as cyclic aliphatic (or cycloaliphatic): partially "neopentylic" and cycloaliphatic; isophorone diisocyanate (IPDI);

as cyclic aliphatic (cycloaliphatic)diisocyanate, those derived from norbornane or the hydrogenated forms (hydrogenation of the nucleus, resulting in a diaminated ring subsequently subjected to isocyanation, for example by phosgenation) of the aromatic isocyanates;

as araliphatic, arylenedialkylene diisocyanates (such as OCN—CH$_2$-Φ-CH$_2$—NCO; a portion of which is regarded as linear aliphatic, namely those having the isocyanate functional group separated from the aromatic nuclei by at least two carbons, such as (OCN—(CH$_2$)$_t$-Φ-[CH$_2$]$_u$—NCO) with t and u greater than 1;

or also aromatic, such as toluylene diisocyanate, mentioned here as a matter of interest but the hydrogenated form of which, on the other hand, is regarded as cycloaliphatic and is advantageous, such as 1,3- and 1,4-BIC (BisIsocyanatomethylCyclohexane).

Generally, the molecular weight of a monomer does not exceed 300 and is at least equal to 100.

According to the present invention, it is desirable for linear aliphatic monomers to be used at least partially for the implementation of the present invention. To those which are mentioned above can also be added lysine derivatives and in particular LDI (Lysine DiIsocyanate, resulting from ester of lysine) or LTI (Lysine TriIsocyanate, resulting from the ester of lysine with ethanolamine), NTI (Nonyl TriIsocyanate OCN—(CH$_2$)$_4$—CH(CH$_2$—NCO)—(CH$_2$)$_3$—NCO) or UTI (Undecyl TriIsocyanate OCN—(CH$_2$)$_5$—CH(—NCO)—(CH$_2$)$_5$—NCO).

The majority of these monomers have a vapor pressure which is too high to meet regulatory requirements relating to safety at work. Consequently, these molecules are increased in size by polycondensing them.

These condensations involve the isocyanate functional groups. As the "monomers" are polyfunctional with regard to isocyanate, these condensations can take place on two or more isocyanate functional groups of the same molecule. It follows that these reactions can result in oligomers which are smaller or bigger in size depending on the degree of conversion of the isocyanates.

The main polycondensates will be restated below:

The derivatives obtained by "trimerization", that is to say that three isocyanate functional groups belonging to three different molecules are condensed to form an isocyanuric ring carrying three groups which themselves carry an isocyanate functional group.

The main units, functional groups or rings liable to be formed on the occasion of the trimerization may be restated:

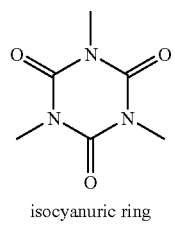

isocyanuric ring

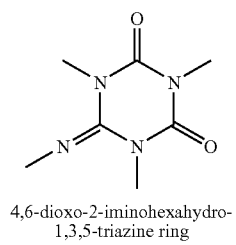

4,6-dioxo-2-iminohexahydro-1,3,5-triazine ring

-continued

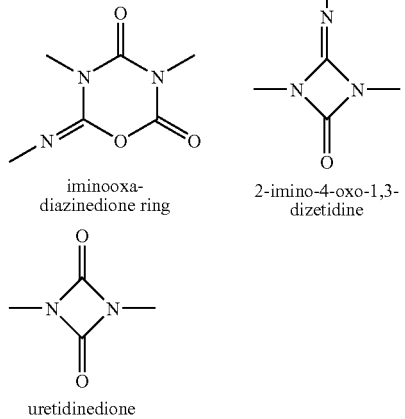

iminooxa-diazinedione ring 2-imino-4-oxo-1,3-dizetidine uretidinedione

Another way of increasing the size of the molecule is to condense them with one another in the presence of water to form a derivative carrying three isocyanate functional groups which is denoted under the expression of biuret. The reaction below shows the reaction in the commonest case, that is to say the case where the three molecules to be condensed are the same:

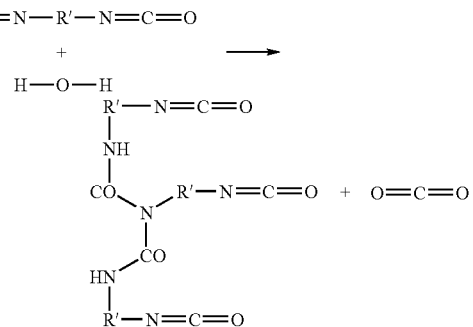

It is also possible to condense these monomers with alcohols, in particular polyols, which gives carbamate and then allophanate polyfunctional compounds.

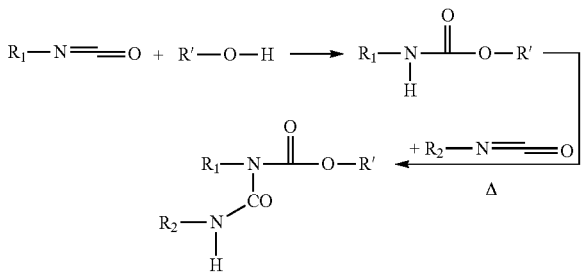

In the polyisocyanate compositions, in addition to the predominant polycondensates, more often than not minor amounts of various condensation types are encountered.

The great majority of isocyanates were until recently essentially dissolved in organic solvents. The use of organic solvents is increasingly often subject to criticism by the authorities in charge of safety at work as these solvents, or at least some of them, are supposed to be toxic or chronically toxic. This is the reason why attempts are increasingly being made to develop technologies which comprise only a very small amount of solvent, indeed which are even devoid of solvent.

In particular, in order to reduce the use of organic solvent, the presence of which is supposed to be toxic to those who handle it and harmful to the environment, the proposal has been made to develop isocyanate compositions which are less viscous.

This lowering in viscosity makes it possible to reduce the amount of solvent and renders the compositions more capable of being emulsified.

Mention may in particular be made, among the most widely used oligomeric polyisocyanate compositions, of the oligomer mixture exhibiting a biuret unit and familiarly denoted by "biuret".

This biuret is currently produced by the action of water on isocyanate monomers in the presence of a very small amount of acid.

The degree of conversion of the monomer is of the order of 45%.

In the case where the monomer is hexamethylene diisocyanate, the viscosity of the product resulting from the synthesis after distillation of the monomer is of the order of 9000 mPa·s.

There are two significant disadvantages to this synthesis: the formation of insoluble ureides, which it is advisable to remove, and, on the other hand, the relatively high viscosity of the product after distillation of the monomer.

Furthermore, the market requires compositions exhibiting a high functionality. This is why one of the aims of the present invention is to provide a process which reduces or eliminates the formation of insoluble ureides.

Another aim of the present invention is to provide isocyanate compositions in which the isocyanate comprises a biuret group.

Another aim of the present invention is to provide a process which makes it possible to reduce the viscosity of the final composition for the same degree of conversion of the monomer(s), the measurement of the viscosity being carried out under "standard" conditions, after removal of the residual monomer(s) (the compositions targeted exhibit, by weight, at most 1%, advantageously at most 0.5%, preferably at most 0.2%, more preferably at most 0.1%). For the measurement of the viscosity, see Standard NFT 30-029 (October 1980).

Another aim of the present invention is to provide compositions comprising a biuret group which exhibit a reduced viscosity.

Another aim of the present invention is to provide polyisocyanate compositions of high functionality which can be used alone or as a mixture with others.

These aims and others which will become apparent subsequently are achieved by means of a process for the synthesis of a polyisocyanate composition comprising acylureas, characterized in that a "starting" composition comprising derivatives comprising at least two isocyanate functional groups is subjected to the action of at least two acids, one at least of which is a strong acid (pKa≦3) and another at least of which is an acid of moderate strength (3≦pKa≦6), at a temperature at least equal to 50° C.

Reference may be made, for the strength of acids, to the work: "The Determination of Ionisation Constants", by Albert & Serjeant, published by Chapman and Hall Ltd (1971).

Superacids (Hammett constant of greater than 13), such as triflic acid or bistrifluoromethylsulfonimide, are not preferred.

The strong or weak acids can be introduced (completely or partially) in the form of a precursor capable of releasing the acid by thermolysis (such as, for example, acid iodoniums according to one of the above definitions) or by hydrolysis (such as symmetrical or unsymmetrical acid anhydrides, including acid halides when the halide anions do not cause trouble).

It is preferable for the temperature to be a temperature at least equal to 50° C. and even at least equal to 100° C. For aromatic carboxylic acids, temperatures equal to at least 110° C. and even 130° C. are preferred.

The reaction is generally carried out at a temperature of at most 200° C., advantageously of at most 180° C., preferably of at most 160° C.

Under these operating conditions, compounds are formed exhibiting an n-acylurea unit (FIG. 1):

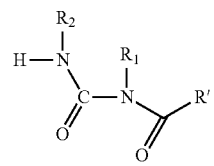

In this formula, $R_2$ and $R_1$, which are identical or different, represent the residue of an isocyanate, generally of a monomer, after ignoring an isocyanate functional group (of course, that which has reacted), and R' is the residue of a carboxylic acid, after ignoring a carboxyl functional group (of course, that which has reacted).

The reaction can be written overall:

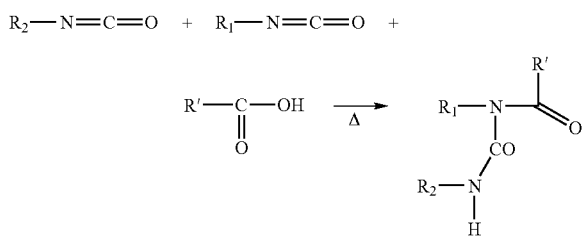

Evolution of carbon dioxide gas (not represented here) occurs.

It is preferable, in the starting mixture, for at least one of the isocyanate derivatives to be a monomer (that is to say, for it to comprise only one diamino unit as defined above). It is also desirable, not taking into account possible solvents, for said starting mixture to comprise, by weight, at least one third and even half, advantageously ⅔, preferably ¾, of monomer(s). Generally, the starting mixture is composed solely of monomer (apart from the impurities and solvent). In the latter case, the monomer derivative or the monomer derivatives represent at least 90%, advantageously 95%, by weight of said starting composition.

Advantageously, the monomer derivative or, when there is more than one of them, at least one of the monomer derivatives is at least partially aliphatic, that is to say that at least one, advantageously two, preferably all, of the amine functional groups of the diamino unit is/are carried by a carbon of $sp^3$ hybridization.

According to an advantageous implementation of the present invention, the synthesis of the acylureas can be carried out in the same reaction medium as the synthesis of biuret. Thus, said polyisocyanate composition comprises derivatives comprising a biuret functional group. To do this, said starting composition is additionally brought into contact with an amine or an amine-generating reactant, advantageously water in the form of a fluid (that is to say, in the vapor or liquid form).

Of course, as this is carried out in existing plants, the water has to be finely dispersed.

Advantageously, said starting composition is additionally brought into contact with an amine or an amine-generating reactant, the molar ratio of the amine (generated or introduced) to the sum of the monomers, expressed in moles, being chosen within the closed range (that is to say, comprising the limits) extending from ½ to 1/50, advantageously within that extending from ⅓ to 1/25.

The synthesis of acylureas can be carried out before the, after the or jointly with the preparation of the derivatives comprising a biuret functional group.

Advantageously, said starting composition is brought into contact with water in the presence of said moderate and strong acid(s).

The strong acid is advantageously chosen from organic acids and in particular aliphatic or aromatic sulfonic, phosphonic, including carboxylic-phosphonic, ester phosphoric or perhaloalkanoic acids. It should be noted that said carboxylic-phosphonic acid is an acid which combines together, in the same molecule, a strong acid and a moderate acid according to the present invention.

In this type of case, it is possible to provide only a single acid. This type of acid results in an acylurea possessing marked surface-active properties.

According to a preferred form of the present invention, said strong acid exhibits, in addition to its strong acidity, another acidity, generally a moderate acidity. In this case, it is preferable for the acid hydrogens to be separated by 3 atoms (such as, for example, in an unesterified phosphonic acid) or 4 atoms (such as, for example, in oxalic acid, but the latter is not preferred as there is a risk of it being unstable at the operating temperature).

According to an advantageous implementation of the present invention, the moderate acids are chosen from aliphatic or aromatic carboxylic acids.

Insofar as they are stable, these acids can comprise ether or thioether functional groups. In particular, they can comprise "alkene oxide" and in particular "ethylene oxide" fragments.

Thus, the compounds carrying at least one carboxylic acid functional group are aliphatic, cycloaliphatic, aromatic or heterocyclic compounds. They comprise at least one carboxylic acid functional group and at most 6, preferably at most 2. The carbon number is between 2 and 20, preferably between 2 and 12. They can comprise heteroatoms or functional groups, such as esters or carbonates or ethers, and the like.

Mention may be made, as nonlimiting examples of compounds comprising at least one carboxyl functional group, of acetic acid, propionic acid, isobutyric acid, pivalic acid, benzoic acid, undecanoic acid, stearic acid, cyclohexanecarboxylic acid and their branched homologs.

Mention may be made, as nonlimiting examples of compounds comprising at least two carboxyl functional groups, of adipic acid, dodecanedioic acid, undecanedioic acid, glutaric acid and their branched homologs, such as 2-ethylhexanoic acid, 2-methylpentanoic acid or 2-ethylsuccinic acid.

Unsaturated acids can also be used, in particular if a two-fold crosslinking operation is envisaged on the composition. Acids such as acrylic, methacrylic or fumaric acids can be used. However, it is then advisable to add radical scavengers which inhibit the vinyl polymerization. Such scavengers are well known to a person skilled in the art.

If the lowering in viscosity is favored, it is preferable to use aliphatic or aromatic monoacids of at most 15, advantageously of at most 12, preferably of at most 10, carbon atoms. These monoacids advantageously have at least two carbons, advantageously at least 3, preferably at least 4. It is also preferable for these acids to exhibit at least one secondary carbon.

If the high functionality is favored, the moderate acids can be di- or triacids. In this case, it is generally advisable to choose such a polyacid so that the formation of the cyclic imides is not promoted. For example, the molecule can be chosen so that the distance between two carboxyl functional groups is sufficient and/or so that the geometry of the molecule is such that the formation of the cyclic imides is not favored. Thus, as is well known to a person skilled in the art, in order to employ such an option, the number of carbons (or of chain atoms, if the chain is not purely of carbon) between two carboxyl functional groups is at least equal to 5 or else the geometry is not favorable thereto, as in the case of terephthalic acid or meta- or para-phenylenediacetic acid; or else both these conditions are met.

The diacylurea (simple) corresponds to the formula:

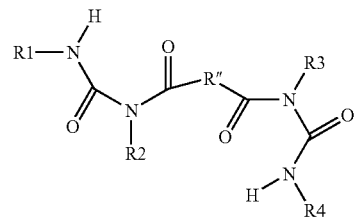

where $R_1$, $R_2$, $R_3$ and $R_4$, which are identical or different, represent the residue of an isocyanate, generally of a monomer (cf. those which are mentioned in the present description and the preferences which are established), after ignoring an isocyanate functional group (of course, that which has reacted), and R" is the residue of a dicarboxylic acid, after ignoring two carboxyl functional groups (of course, those which have reacted).

It should be pointed out that the moderate acids can be replaced, completely or partially, by carboxamides carrying at least one hydrogen on the nitrogen in order to produce acylureas. However, these acylureas react only once with a dimer, which renders them less advantageous than those resulting from the carboxylic acids.

It should be noted that the dividing line between strong acids and moderate acids makes it possible for the acidities to be close (indeed even for there to be a slight overlap) but the system operates best when at least one of the moderate acids exhibits an acidity which is significantly lower than that of at least one of the strong acids. Thus, it is desirable for the pKa of the strong acid to differ from that of the moderate acid by at least one unit, advantageously 2. In the case of a plurality of strong acids and/or of moderate acids, the rule is set out as below. It is desirable for the pKa of at least one of the strong acids to differ by at least one pK unit, advantageously 2 pK units, from that of at least one of the moderate acids, advantageously from all those of the moderate acids.

The content of strong acid(s) is chosen so that the molar ratio of the sum of the strong acid functional groups, expressed as equivalents, to the sum of the monomers, expressed as moles, is at least equal to 0.1%, advantageously to 0.5%, preferably to 1%.

With regard to the upper value, it is desirable for the content of strong acid(s) to be chosen so that the molar ratio of the sum of the strong acid functional groups, expressed as equivalents, to the sum of the monomers, expressed as moles, is at most equal to 2%, advantageously to 1%.

The content of moderate acid(s) is chosen so that the molar ratio of the sum (numerator) of the moderate acid functional groups, expressed as equivalents, to the sum (denominator) of the monomers, expressed as moles, is at least equal to 2%, advantageously to 5%, preferably to 1%.

If it is desired to maximize the viscosity-lowering effect, it is preferable to limit the amount of the moderate acids involved in the reaction. This amount is a content when all the acids and monomer(s) are introduced from the beginning. The amount of moderate acid(s) is chosen so that the molar ratio of the sum of the moderate acid functional groups, expressed as equivalents, to the sum of the monomers, expressed as moles, is at most equal to 10%, advantageously to 5%. In the case of the viscosity not being favored, it is possible to rise to 20%.

As regards said strong acid or the mixture of strong acids, it is generally introduced before the heating of the reaction mixture is begun.

It is generally introduced in a dilute form, advantageously a form diluted with at most 50 times, preferably with 1 to 20 times, its weight of diluent.

According to one implementation of the present invention, said strong acid is diluted in water; in other words, the diluent is water or an aqueous mixture.

According to one embodiment of the present invention, said strong acid is diluted in a $C_1$ to $C_{14}$ alcohol, advantageously a $C_3$ to $C_{10}$ alcohol.

According to a preferred implementation of the present invention, said strong acid is diluted in said moderate acid or a mixture of said moderate acids.

In the context of a simultaneous synthesis of biuret and of acylureas, it is advisable to restate the usual sequences and how the synthesis of acylurea is inserted.

The synthetic process comprises the series of following operations:
  introducing an isocyanate, preferably a diisocyanate, or a mixture of isocyanates into a reactor,
  adding, to the mixture of isocyanates, the carboxyl compound(s) or the amide(s),
  adding the biuretization catalyst or the mixture of biuretization catalysts comprising at least one strong acid functional group and one carboxylic acid functional group,
  heating the mixture to a temperature of approximately 140° C.,
  injecting the biuretization agent, water, so that the release of carbon dioxide gas is controlled,
  maintaining the reaction medium at a temperature of between 130° C. and 160° C. for a time of between 1 and 5 hours,
  removing the unreacted isocyanate monomer(s) by a suitable process, such as vacuum distillation on a thin film device,
  recovering the polyisocyanate biuret acylurea composition.

Another aim of the present invention is to provide polyisocyanate compositions having a reduced viscosity and/or a high functionality.

This aim, and others which will become apparent subsequently, is achieved by means of a polyisocyanate composition comprising acylureas.

These compositions can be obtained either by the process which cosynthesizes the acylureas and the nonacylated oligomers (such as biuret) and which has just been set out, or by mixing acylureas prepared in isolation. The second route is more expensive but more effective for lowering viscosity.

The acylureas according to the present invention make it possible to modify the properties of the polyisocyanate compositions conventionally marketed (cf. the introduction).

It is preferable for the acylureas to be as light as possible, that is to say for them to be advantageously composed of at most 5 diamino units.

This is because the reaction can take place on any isocyanate functional group, whether this functional group belongs to a monomer or whether it belongs to an oligomer. In order for the acylureas to have a marked favorable effect, it is preferable for them not to incorporate very much in the way of monomers and thus for them not to exhibit very much in the way of diamino units as defined above.

It should be remembered that the monoacylurea (corresponding to one monocarboxylic acid) comprises only two diamino units, that the bisacylurea corresponds to three monomers (and two monocarboxylic acids) and thus exhibits three diamino units, that the diacylureas resulting from the diacids comprise 4 diamino units, that the acylurea of a true trimer or of a true biuret exhibits 4 diamino units.

In order to improve the viscosity properties of a composition, it is desirable for it to comprise at least 1% (by weight), advantageously at least 1.5%, preferably at least 2%, of acylureas of at most 5 diamino units and even of at most 3 diamino units. Advantageously, such a composition comprises at least 1% (weight), preferably at least 1.5%, more preferably at least 2%, of monoacylurea.

The compositions according to the present invention are also targeted at increasing the functionality. In this case, they can comprise, by weight, at least 2% of diacylurea corresponding to an at least bifunctional acid, such as adipic acid, advantageously at least 5%, preferably at least 10%.

Very clearly, the compositions according to the present invention can comprise both monoacylureas and diacylureas and meet the constraints of the two preceding paragraphs.

The present invention is particularly well suited to compositions based on a biuret functional group.

Consequently, according to the present invention, it is desirable for the compositions to comprise, by weight, at least 10%, advantageously 15%, preferably 25%, of true biuret (that is to say, comprising only a single biuret functional group and three diamino units).

The present invention is especially advantageous for highly condensed compositions comprising a relatively high content of heavy oligo condensates. It is consequently desirable for such a composition to comprise, by weight, at most ⅘, advantageously ⅔, preferably at most half, of true biuret (three biuret units).

In order to generalize to the various condensates, including comprising an isocyanuric functional group, and similarly, it is desirable for the ratio by weight of the sum of the monoacylureas (numerator) to the sum of the oligomers of at least six diamino units to be at least equal to 2%, advantageously to 5%, preferably to 7%. Generally, in order to prevent the functionality from suffering because of the presence of the acylureas, the ratio by weight of the sum of the monoacylureas (numerator) to the sum of the oligomers of at least six diamino units is at most equal to 50%, advantageously to 40%, preferably to 20%.

To return more specifically to the biuret, the degree of conversion of the isocyanate monomers depends on the NCO/biuretization agent and NCO/carboxyl and/or amide functional groups ratios. The greater the NCO/nucleophiles (compounds comprising mobile hydrogen) ratio, the lower the degree of conversion of isocyanate functional groups. Furthermore, the greater the degree of conversion, the greater the viscosity of the polyisocyanate compositions obtained. The NCO/nucleophiles (compounds comprising mobile hydrogen) ratio, which determines the degree of conversion of the isocyanate functional groups or the degree of conversion of the isocyanate monomers, is set according to the polyisocyanate compositions to be obtained. Generally, the degree of conversion of the monomers is between 5 and 90%, preferably between 10 and 60%.

Surprisingly, in comparison with conventional biurets obtained from hexamethylene diisocyanate (HDI), the compounds which are subject matters of the invention are characterized by a lower viscosity, which is advantageous in reducing the volatile organic compounds discharged to the atmosphere. The viscosity of the compounds which are subject matters of the invention depends very obviously on the isocyanate monomer involved, cycloaliphatic compounds giving generally higher viscosities than aliphatic isocyanate derivatives (called "linear" in the present description) with a short chain (4 to 10 chain members).

According to a preferred implementation of the present invention, the compositions of the invention obtained by the process are characterized by:
  the presence of at least 5% of compounds comprising true biuret units,
  the presence of at least 1.5% of true acylurea compounds,
  an NCO content of between 0.5 and 25% by weight of NCO per 100 g of composition, preferably of between 1 and 20%,
  the presence of polybiuret and/or acylurea compounds.

The compounds which are subject matters of the invention can be used for the synthesis of functional derivatives or the preparation of compositions for coatings applied to organic or inorganic surfaces (metal, plastics, wood, cloth, leather, concrete, and the like) for decorative, functional and/or protective purposes.

The compounds of the present invention can also be incorporated in the manufacture of materials based on polyurethanes (foams), on elastomers, on fibers or on rubbers. The fields of application are therefore highly diverse (paints, varnishes, adhesives, tires, and the like) and relate equally well to interior applications as to exterior applications or applications exposed to particular media (materials immersed in water, and the like).

The compounds of the invention exhibit low coloring indices of less than 200 hazen. The isocyanate functional groups carried by the compounds of the invention of the final mixture can be definitively or temporarily and completely or partially functionalized by various nucleophilic components which can be chosen from:
  agents for temporarily blocking isocyanate functional groups well known to a person skilled in the art, such as oximes, pyrazoles, triazoles, imidazoles, lactams or ketoesters, it being possible for all these compounds to carry one or more substituents. Mention may thus be made, as nonlimiting examples, of methyl ethyl ketoxime, 3,5-dimethylpyrazole, ε-caprolactam, and the like,
  alkoxysilanes comprising nucleophilic functional groups, such as, for example, amino- or thioalkyltrialkoxysilanes,
  hydroxyalkyl acrylates,
  chain extenders, such as diamines, diols or polyols.

These compounds can be reacted in the organic phase or in the aqueous phase.

In the case of coatings of polyurethane or polyurea type, the coreactants of the compounds of the invention can be:
  acrylic poly(thi)ols derived from the polymerization of monomer compounds carrying activated double bonds, such as (cyclo)alkyl or hydroxyalkyl acrylates or methacrylates,
  acrylic polyamines,
  polyester poly(thi)ol or polyamine polymers resulting from the polycondensation of a diacid or diester or carbonate with a diol or an aminoalcohol,
  polycarbonate poly(thi)ol polymers,
  polysiloxane compounds comprising alkyl units carrying hydroxyl and/or amino and/or thio functional groups polyamines,
  polyethers carrying hydroxyl and/or amine and/or thiol functional groups hydroxyl functional groups,
  polyprene compounds comprising hydroxyl or carboxylic acid functional groups,
  alkoxysilanes,
  or polymer compounds comprising temporarily blocked hydroxyl, thiol or amine functional groups. Mention may be made, as examples of these blocked functional groups, of imines, dioxolanes, acetals, and the like.

The synthesis of these polymers and the constituent monomers of these polymers are fully known to a person skilled in the art. Mention may be made, as examples of monomers carrying double bonds, of n-butyl, cyclohexyl, methyl, isopropyl or tert-butyl acrylates and methacrylates, acrylamide and methacrylamide as well as their N-alkylated derivatives, acrylic acid and methacrylic acid, styrene, butadiene or vinyl derivatives.

Mention may be made, as nonlimiting examples of monomers of the polycondensation reaction, of adipic acid, succinic acid, glutaric acid, dodecanedioic acid, phthalic acid or the esters of these diacids, alkylene carbonates, such as methyl carbonate, ethyl carbonate, propylene carbonate or ethylene carbonate, diols, such as butanediols, hexanediols, cyclohexanediols, and the like.

Mention may be made, as examples of polyether compounds or epoxy polymers, of ethylene oxide or propylene oxide.

Compounds such as various fillers, catalysts, rheology additives or pigments can be added to the formulations to introduce the desired properties.

The following examples are representative of the invention.

Analytical Methods:

Quantitative determination of the isocyanate functional groups: The standardized method for the quantitative determination of isocyanate functional groups by the "dibutylamine" method is used. Back titration with a standard HCl solution of the N,N-dibutylamine not consumed by the reaction with the isocyanate functional groups of the mixture to be quantitatively determined. The difference between the N,N-dibutylamine which has reacted and the amount introduced makes it possible to measure the content of isocyanate functional groups in the mixture to be quantitatively determined.

Determination of Mn and Mw Values of the Polymers:

Gel permeation chromatography is used as method for determining the number-average and weight-average molecular weights. Polystyrene standards of known molecular weight are used to calibrate the gel permeation columns. The elution solvent used is a good solvent for the standard polymers and for the polymers to be analyzed. It is chosen taking into account the restrictions introduced by the method for detecting the polymers (refractometry or analysis by ultraviolet absorption or analysis by infrared). This solvent is chosen from ethers, such as tetrahydrofuran, chlorinated derivatives, such as dichloromethane, and the like.

The elution volume of the polymers to be analyzed is compared with the elution volumes of the standard polymers and the molecular weight is thus deduced therefrom. The constituent eluted oligomers of the mixture to be analyzed can also be recovered separately for analysis and characterization by various structural analytical techniques, such as $^1$H NMR, $^{13}$C NMR, infrared, and the like.

These techniques make possible excellent determination of the amounts of oligomer with a molecular weight of less than 1500.

Determination of the Viscosity

Two methods giving substantially identical results are used to determine the viscosity. The results are given for a temperature of 25° C.

The first method is based on Standard NFT 30-029 of Oct. 1980: operating method for a rotary viscometer for measuring the apparent dynamic viscosity of varnishes, paints and associated preparations.

A rheometer with the Rheovisco LV8 brand name is used to do this. The operating temperature is 25° C. The choice of the equipment and the operating conditions selected depend on the viscosity range. Thus, for a viscosity range of between 0 and 5000 mPa·s, use is made of the L2 cylinder with a speed of 6 revolutions/minute, for a viscosity range of between 0 and 20 000 mPa·s, use is made of the L3 cylinder with a speed of 6 revolutions/minute and, for a viscosity range of between 0 and 1000 mPa·s, use is made of the L1 cylinder with a speed of 6 revolutions/minute.

A second method used to measure the viscosity is the "ball drop" method. The value measured is very close to the value given by the preceding method.

Use is made of a stainless steel ball of known density (d=7.8) and known diameter (2 mm).

The polyisocyanate of unknown viscosity is introduced into a test tube with a diameter of 20 mm and a height of 20 cm. The tube has two marks separated by 10 cm. It is conditioned at the measuring temperature (25° C.) by immersing in a thermostatically controlled and regulated bath.

A ball is placed on the top of the liquid and the time which it takes to cover the distance between the marks is measured. The value of the viscosity is obtained by application of the following formula and is expressed in mPa·s at 25° C.

Viscosity at 25° C.=1.11×t×100 with t the ball drop time in seconds for a distance of 10 cm between the marks.

SYNTHETIC EXAMPLES

Example 1

Polyisocyanate Composition Comprising Biuret and Acylurea Units

The equipment used comprises a 2 l reactor rendered inert with nitrogen and equipped with a mechanical stirrer, a reflux condenser, gas discharge valves and a dip pipe connected to a second vertical tubular reactor with a length of 40 cm and a diameter of 1 cm preheated to approximately 200° C. and swept with nitrogen, this tubular reactor being itself connected to a device for feeding liquid water.

1000 g of hexamethylene diisocyanate (HDI) are introduced into the 2 liter reactor.

The starting NCO content is 1.19. The temperature of the reaction medium is 21° C. 2.58 g of a 50% by weight solution of dibutyl phosphate (DBP) in 2-ethylhexanol and 0.89 g of propionic acid are added. The respective DBP/HDI and propionic acid/HDI molar ratios are $1\times10^{-3}$ and $2\times10^{-3}$. The reaction medium is stirred at 250 revolutions per minute. The temperature of the reaction medium is brought to 140° C.

19 g of water, i.e. an HDI/H$_2$O molar ratio of 5.65, are introduced into the device for feeding water.

The 19 g of water are injected over 1 hour, the water changing from the liquid state to the vapor state in the tubular reactor swept with nitrogen (120 l/hour). The reaction begins immediately and evolution of carbon dioxide is observed. The temperature of the reactor is maintained at 140° C.

The NCO content of the reaction medium after injecting water for 20 minutes is 1.138. After 35 minutes, it is 1.060.

At the end of the injection of the water, the NCO content is 0.961 mol per 100 g. Virtually no insoluble particles of HDI polyurea are observed.

The reaction mixture is left stirring for a further 2 hours, at the end of which time the NCO content of the reaction medium stabilizes at 0.901 mol per 100 g. The degree of conversion of HDI is of the order of 48.7%.

The reaction medium is then filtered through a No. 1 sintered glass funnel to give a level of insolubles of 20.5 mg for a weight of reaction medium recovered of 961 g. 860 g of the reaction medium are subsequently purified by 2 successive distillations of HDI monomer on a thin film device under a vacuum of 0.2 mbar and at 160° C. with a throughput of 400 g/hour for the first pass and 200 g/hour for the second pass. 310 g of a polyisocyanate composition comprising biuret and acylurea units are recovered, the NCO content of which composition is 22.5% and the viscosity of which composition at 25° C. is 4850 mPa·s. The level of HDI monomer is less than 0.5%.

Analysis by gel permeation chromatography coupled to infrared analysis and supported by $^{13}$C NMR analysis makes it possible to show that:

the content of true acylurea of HDI and of propionic acid is 1.5% by weight,
the content of true biuret is 43%,
the content of HDI dimer is 4.3%.

Example 2

Polyisocyanate Composition Comprising Biuret and Acylurea Units

The same type of arrangement of reactors is available as in example 1 and the process is carried out in the same way, except that 1500 g of HDI, 3.1 g of propionic acid and 23 g of 20% by weight para-toluenesulfonic acid (pTSA) in 2-ethylhexanol as strong acid catalyst are employed.

The amount of water is 25 g.

The respective molar ratios are: pTSA/HDI: $3\times10^{-3}$; propionic acid/HDI: $5.2\times10^{-3}$; HDI/H$_2$O: 6.4.

The content of the reaction medium after addition of the propionic acid and of the pTSA catalyst solution is 1.146.

The NCO content of the reaction medium after injecting water for 45 minutes is 0.950.

At the end of the injection of the water, the NCO content is 0.871 mol per 100 g. Virtually no insoluble particles of HDI polyurea are observed.

The reaction mixture is left stirring for a further 2 hours, at the end of which time the NCO content of the reaction medium stabilizes at 0.834 mol per 100 g. The degree of conversion of HDI is of the order of 55%.

The reaction medium is then filtered through a No. 1 sintered glass funnel to give a level of insolubles of 38 mg for a weight of reaction medium recovered of 1430 g. The polyisocyanate composition comprising biuret and acylurea units obtained after distillation exhibits an NCO content of 21.8%.

The level of HDI monomer is less than 0.5%. The level of acylurea of HDI and of propionic acid is 2.3%. The content of HDI dimer is 4%. The content of true biuret is 40%.

What is claimed is:

1. A process for the synthesis of a polyisocyanate composition comprising acylureas, comprising the step of reacting a starting composition comprising at least one compound having at least two isocyanate functional groups with either:
   (1) an acid having at least two acid functional groups, at least one of said acid functional groups having a pKa value of less than or equal to 3, and at least one acid functional group having a pKa value of more than 3 and less than or equal to 6, or
   (2) a first acid having at least one acid functional group having a pKa value of less than or equal to 3, and a second acid having at least one acid functional group having a pKa value of more than 3 and less than or equal to 6, at a temperature at least equal to 50° C.

2. The process as claimed in claim 1, wherein at least one compound having at least two isocyanate functional groups is a monomer.

3. The process as claimed in claim 2, wherein the at least one compound having at least two isocyanate functional groups represent at least ⅓, by weight of said starting composition.

4. The process as claimed in claim 2, wherein the monomer derivatives represent at least ½, by weight of said starting composition.

5. The process as claimed in claim 2, wherein the at least one compound having at least two isocyanate functional groups represents at least 90%, by weight of said starting composition.

6. The process as claimed in claim 1, wherein the at least one compound having at least two isocyanate functional groups is at least partially aliphatic.

7. The process as claimed in claim 1, wherein said polyisocyanate composition further comprises a compound having a biuret functional group, synthesized by bringing said starting composition into contact with an amine or an amine-generating reactant.

8. The process as claimed in claim 7, wherein said amine-generating reactant is water in the form of a fluid.

9. The process as claimed in claim 7, wherein said at least one compound is a monomer and wherein the molar ratio of the amine generated or added to the total amount of the monomer, expressed in moles, is from ½ to ¹⁄₅₀.

10. The process as claimed in claim 7, wherein said at least one compound is a monomer and wherein the molar ratio of the amine generated or added to the total amount of the monomers, expressed in moles, is from ⅓ to ¹⁄₂₅.

11. The process as claimed in claim 7, wherein said starting composition is brought into contact with water in the presence of (1) an acid having at least two acid functional groups, at least one of said acid functional groups having a pKa value of less than or equal to 3, and at least one acid functional group having a pKa value of more than 3 and less than or equal to 6, or (2) a first acid having at least one acid functional group having a pKa value of less than or equal to 3, and a second acid having at least one acid functional group having a pKa value of more than 3 and less than or equal to 6.

12. The process as claimed in claim 1, wherein the acid having at least one acid functional group having a pKa value of less than or equal to 3 is an aliphatic sulfonic acid, an aromatic sulfonic acid, an aliphatic phosphonic acid, an aromatic phosphonic acid, a carboxylic-phosphonic acid, a phosphoric ester or a perhaloalkanoic acid.

13. The process as claimed in claim 1, wherein the acid having at least one acid functional group having a pKa value of more than 3 and less than or equal to 6 is an aliphatic or aromatic carboxylic acid.

14. The process as claimed in claim 1, wherein the acid having an acid functional group having a pKa value of more than 3 and less than or equal to 6 is at least partially added to the reaction medium in the form of a precursor.

15. The process as claimed in claim 1, wherein the acid having an acid functional group having a pKa value of less than or equal to 3 is at least partially introduced into the reaction medium in the form of a precursor.

16. The process as claimed in claim 2, wherein the molar ratio of the sum of the acid functional group having a pKa value of less than or equal to 3, expressed as equivalents, to the total amount of the monomers, expressed as moles, is at least equal to 0.1%.

17. The process as claimed in claim 2, wherein the molar ratio of the sum of the acid functional group having a pKa value of less than or equal to 3, expressed as equivalents, to the total amount of the monomers, expressed as moles, is at most equal to 2%.

18. The process as claimed in claim 2, wherein the molar ratio of the sum of the acid functional group having a pKa value of more than 3 and less than or equal to 6, expressed as equivalents, to the total amount of the monomers, expressed as moles, is at least equal to 2%.

19. The process as claimed in claim 18, wherein the molar ratio of the sum of the acid functional group having a pKa value of more than 3 and less than or equal to 6, expressed as equivalents, to the total amount of the monomers, expressed as moles, is at most equal to 10%.

20. The process as claimed in claim 1, wherein said acid having a pKa value of less than or equal to 3 is added in a dilute form.

21. The process as claimed in claim 20, wherein said diluent is water or a C1 to C14 alcohol.

22. The process as claimed in claim 1, wherein said acid having a pKa value of less than or equal to 3 is present in a first compound and said acid having a pKa value of more than 3 and less than or equal to 6 is present in a second compound.

23. The process as claimed in claim 1, wherein said acid functional group having a pKa value of less than or equal to 3 and said acid functional group having a pKa value of more than 3 and less than or equal to 6 are present in the same compound.

24. The process as claimed in claim 22, wherein said acid having a pKa value of less than or equal to 3 is diluted in said acid having a pKa value of more than 3 and less than or equal to 6.

* * * * *